United States Patent [19]
Vice

[11] Patent Number: 5,581,574
[45] Date of Patent: Dec. 3, 1996

[54] METHOD AND APPARATUS FOR CONDITIONING AND USING FURNACE OFF-GASES IN A SCRAP PREHEATING APPARATUS

[75] Inventor: David E. Vice, Ashland, Ky.

[73] Assignee: Technology Holdings, Inc., Versailles, Ky.

[21] Appl. No.: 441,616

[22] Filed: May 15, 1995

Related U.S. Application Data

[63] Continuation-in-part of Ser. No. 148,841, Nov. 5, 1993, Pat. No. 5,416,792, and a continuation-in-part of Ser. No. 353,193, Dec. 9, 1994, abandoned.

[51] Int. Cl.$^6$ .................................................. F27D 13/00
[52] U.S. Cl. ................... 373/80; 373/8; 373/20; 373/78
[58] Field of Search ............................. 373/8–9, 20–21, 373/18, 43, 78–80, 42; 432/9–10, 103, 179; 75/28, 43, 433, 10.36; 266/44, 157

[56] References Cited

U.S. PATENT DOCUMENTS

| | | | |
|---|---|---|---|
| 4,280,836 | 7/1981 | Maeda ........................................... | 75/12 |
| 4,395,280 | 7/1983 | Takenouchi et al. ....................... | 75/28 |
| 4,470,804 | 9/1984 | Geijer et al. ............................... | 373/80 |
| 4,506,370 | 3/1985 | Yoshimatsu ................................ | 373/8 |
| 4,611,339 | 9/1986 | Saitoh ........................................ | 373/80 |
| 4,653,065 | 3/1987 | Seki et al. ................................. | 373/80 |
| 4,736,383 | 4/1988 | Meierling ................................... | 373/78 |
| 5,416,792 | 5/1995 | Vice ........................................... | 373/80 |

Primary Examiner—Tu Hoang
Attorney, Agent, or Firm—Wheat, Camoriano, Smith & Beres, PLC

[57] ABSTRACT

A preheat system for a furnace comprising a preheat vessel on a rotating turret and a receiving chamber for conditioning furnace off-gases prior to use in preheating.

10 Claims, 7 Drawing Sheets

METHOD AND APPARATUS FOR CONDITIONING AND USING FURNACE OFF-GASES IN A SCRAP PREHEATING APPARATUS

BACKGROUND OF THE INVENTION

This is a continuation-in-part of U.S. patent application Ser. No. 08/148,841, filed Nov. 5, 1993, which is U.S. Pat. No. 5,416,792, which is hereby incorporated by reference and is a continuation-in-part of U.S. patent application Ser. No. 08/353,193, filed Dec. 9, 1994, now abandoned. The present invention relates to furnaces, and, in particular, to a system for preheating material before it enters the furnace, using conditioned off-gases from the furnace as the primary heating source.

Heating and melting furnaces, and in particular electric arc furnaces, are used to heat or melt various materials. Electric arc furnaces pass an electric arc (current) through ferrous metallic scrap or other feed stock in order to melt these materials. During this production process, large quantities of very hot particulate-laden gases (fumes) are generated. These gases create a problem, in that they are very hot (frequently 2500° F. or greater), abrasive, difficult to handle, and cannot be vented directly into the environment due to the particulate material in them. These gases are usually drawn out of the furnace through a hole in the furnace roof (and are then referred to as off-gases). Ambient air is introduced into this off-gas stream to provide oxygen for ignition and burning of any combustible gases or particulate materials present. The off-gases typically enter a combustion chamber located immediately adjacent to the furnace, where the off-gases are allowed a residence time for combustion. The off-gases are then cooled, usually by passing through them water-cooled ductwork, and filtered through a baghouse, scrubber, precipitator or other device with a similar function, to collect the particulate matter prior to discharge of the residual fumes into the atmosphere. A large motor driven fan is incorporated in the system to draw the fumes from the furnace through the dust collection device.

If these furnace off-gases can be used to preheat material to be charged into the furnace, several problems can be solved at once. First, the amount of time and energy required to melt the materials in the furnace can be reduced, resulting in considerable cost savings in the production process. Second, since the off-gases are cooled as they are used in the preheat process, the extensive cooling systems can be eliminated or greatly reduced, saving considerable capital and operating expense. Third, some of the particulate matter present in the off-gases becomes trapped in the scrap and is subsequently recharged into the furnace, thus reducing the waste material to be disposed from the dust collection device and increasing the product yield from the furnace.

There are several systems in use or proposed which are intended to use furnace off-gases to preheat the material to be charged into the furnace, but there are problems with all of these existing systems. Some systems using off-gases for preheating require a complete redesign of the production process and equipment. Some systems cannot be placed into an existing facility because of space or logistics problems. Other systems are simply not compatible with normal furnace operations, because they do not permit good operating practices, or for other reasons. In some designs the preheater cannot be bypassed when maintenance problems occur, which is clearly an undesirable characteristic. Most of the existing systems are very maintenance-intensive and/or have high operating expenses. Some other systems require additional processing of materials, particularly scrap, prior to use or are limited to certain specific types or sizes of scrap.

Some systems preheat the charging bucket containing the scrap each time the scrap is preheated by placing the loaded bucket into a preheating chamber. Because the bucket has a significant weight relative to the contents, much energy is wasted in heating the bucket. This procedure is also damaging to the bucket, increasing maintenance costs.

In many designs, a new load of material to be preheated cannot be prepared or placed in position until after the furnace begins the next production cycle. The preheater is therefore not "on-line" as soon as the furnace begins the melting process, thus losing the opportunity to use all of the off-gas stream for preheating. In certain systems, the movement of the preheating vessel (bucket) to the furnace following preheating is done by the charging crane. After charging the furnace the crane must set the bucket down before it can move another bucket of cold scrap into the preheating system, again reducing the available preheating time.

Existing systems located in the immediate vicinity of the furnace conduct off-gases from the furnace directly into the scrap vessel or chamber. Since these off-gases typically reach temperatures in excess of 2500° F., they are very damaging to the ductwork and ductwork dampers exposed to the gases. The scrap-containing vessels are also difficult to maintain when exposed continually to such high temperatures.

When off-gases of such high temperature are introduced into the scrap, the rate of heat transfer from the off-gases to the scrap is extremely high. Thus the scrap located immediately in front of the off-gas entry may actually melt, causing the scrap to form a large clump that may wedge in the vessel or stick to the vessel side. As the off-gases cool rapidly as they pass through the scrap, the scrap on the exit side of the vessel may be over one thousand degrees cooler than scrap on the entry side. This unbalanced heating of the scrap adversely affects the operation of the furnace when the preheated scrap is loaded into it.

Because of the space required for some preheat systems, the systems may not be located in the immediate vicinity of the melting furnace. When the preheat station is located at some distance from the furnace, several different problems result. First, the heated vessel must be moved by crane or other device through the operating area to the furnace, resulting in a loss of preheat temperature and the escape of irritating or hazardous fumes into the air. Second, in order to transport the vessel to the furnace area in time to quickly charge the furnace when it is shut off for loading, the vessel must be removed from the preheat station prematurely, thus resulting in a loss of efficiency in the preheat process. Third, due to the distance between the furnace and the vessel, much of the energy in the off-gases are lost before they reach the material to be preheated, resulting in a loss of efficiency and in incomplete combustion of scrap contaminants such as oil, grease, plastics, and fibers. This partial combustion results in an undesirable fume emission from the preheat system and, in turn, from the baghouse. Fourth, because the system is remote from the furnace, great lengths of water cooled ductwork are required to transport the off-gases to the preheating station, wasting energy and creating a large capital and maintenance expense.

Electric furnace operations in general have an additional problem. The material to be charged into the furnace is usually scrap material that includes contaminants such as oils, greases, plastics, fibers, and water or ice. When the material is charged into the furnace, the residual heat in the furnace causes a flash ignition of these various combustible contaminants in the scrap, and a large plume of flame and dust particles rises to the roof of the shop building. Large overhead canopies must be located above the furnace to capture this plume. The fumes are then carried to the baghouse or other dust collecting device through ductwork attached to the canopies. These large canopies capture not only the plume, but also a very large volume of air from outside the furnace that travels up with the plume. This requires that the baghouse or other system for cleaning the air be sized to handle this large volume of air. Even with these overhead canopies and large air-cleaning systems, considerable dust remains in the air inside the building, which is undesirable.

In some installations, separate enclosures are built around the furnace to capture charging emissions. Large doors are opened to permit a crane to place the charging bucket into the enclosure. The doors are closed, charging of the furnace occurs, and the doors are opened to permit removal of the charging bucket. Use of such enclosures also requires that large volumes of air be collected to capture the charging emissions, although the air volume is somewhat less than that required for an overhead canopy system. Typically some collection of fugitive emissions in the roof area is still required. Such furnace enclosures are expensive, are easily damaged (particularly the large doors), and considerably disrupt efficient charging and operating practices.

With either an overhead canopy or an enclosure, the charging plume contains unburned hydrocarbons and other partially combusted materials. These fumes are generally not captured by the dust collection device and therefore escape into the atmosphere. The material so released during charging usually represents the most significant escape of such pollutants from an electric furnace operation.

Existing preheat systems utilizing a crane to transport the preheated scrap vessel to the furnace produce a charging plume, and therefore are subject to the problems attendant with plumes as well as the previously described environmental problems occuring when moving preheated scrap to the furnace for charging.

The few existing preheating systems not using a crane to transport preheated scrap typically employ a second combustion chamber after the preheating equipment, with supplemental gas burners used to raise the fume temperature to a level (typically 1600° F.) sufficient to insure complete combustion of any residual combustible matter. This reheating of the off-gases is very inefficient.

SUMMARY OF THE INVENTION

The present invention provides a novel means and apparatus for preheating certain materials prior to charging the materials into a heating or melting furnace. By using the off-gas to preheat the materials, considerable savings are realized in energy costs. Since the material is preheated before entering the furnace, it can be heated or melted more quickly once it enters the furnace, permitting greater production through the furnace in a given period of time.

The present invention eliminates the problems of the prior art. The present invention places the material that is preheated very close to the furnace, thereby maximizing the energy transferred into the material to be preheated and greatly reducing the need for expensive water-cooled ductwork and attendant water systems. The present invention can be installed as a retrofit to existing furnaces, due to the space saving design, thereby providing its benefits not only in new construction but also in existing construction. The present invention permits the off-gas to be used for preheating during the entire heating cycle, so no time or energy is lost. The present invention does not require modifications to either the furnace itself or to current operating practices. No additional processing of scrap or other material to be preheated is required.

By conditioning the off-gases immediately after the gases exit the furnace, thereby reducing the temperature of the off-gases, the problems associated with the use of 2500° F. off-gases are greatly reduced. The system is therefore much more reliable as well as less costly to operate. Futher, no supplemental burners or secondary combustion chamber for reheating of the off-gases after preheating are required.

The present invention provides an additional benefit to a conventional electric arc furnace operation, allowing for the dust collection system to remain connected by ductwork to the heating vessel throughout the charging process, including movement to and from the furnace. The charging plume is directly captured above the furnace, thereby sharply reducing the escape of fumes into the shop. This in turn sharply reduces the volume of air required to be captured by the overhead canopies, thus greatly reducing the amount of air that must be passed through a baghouse or other air-cleaning system. Therefore the air-cleaning system can be made much smaller and less expensive, resulting in considerable capital and operating cost savings.

BRIEF DESCRIPTION OF THE DRAWINGS

FIG. 1 is a schematic of a furnace preheat system made in accordance with the present invention;

DESCRIPTION OF THE PREFERRED EMBODIMENTS

Figures 1, 1A:
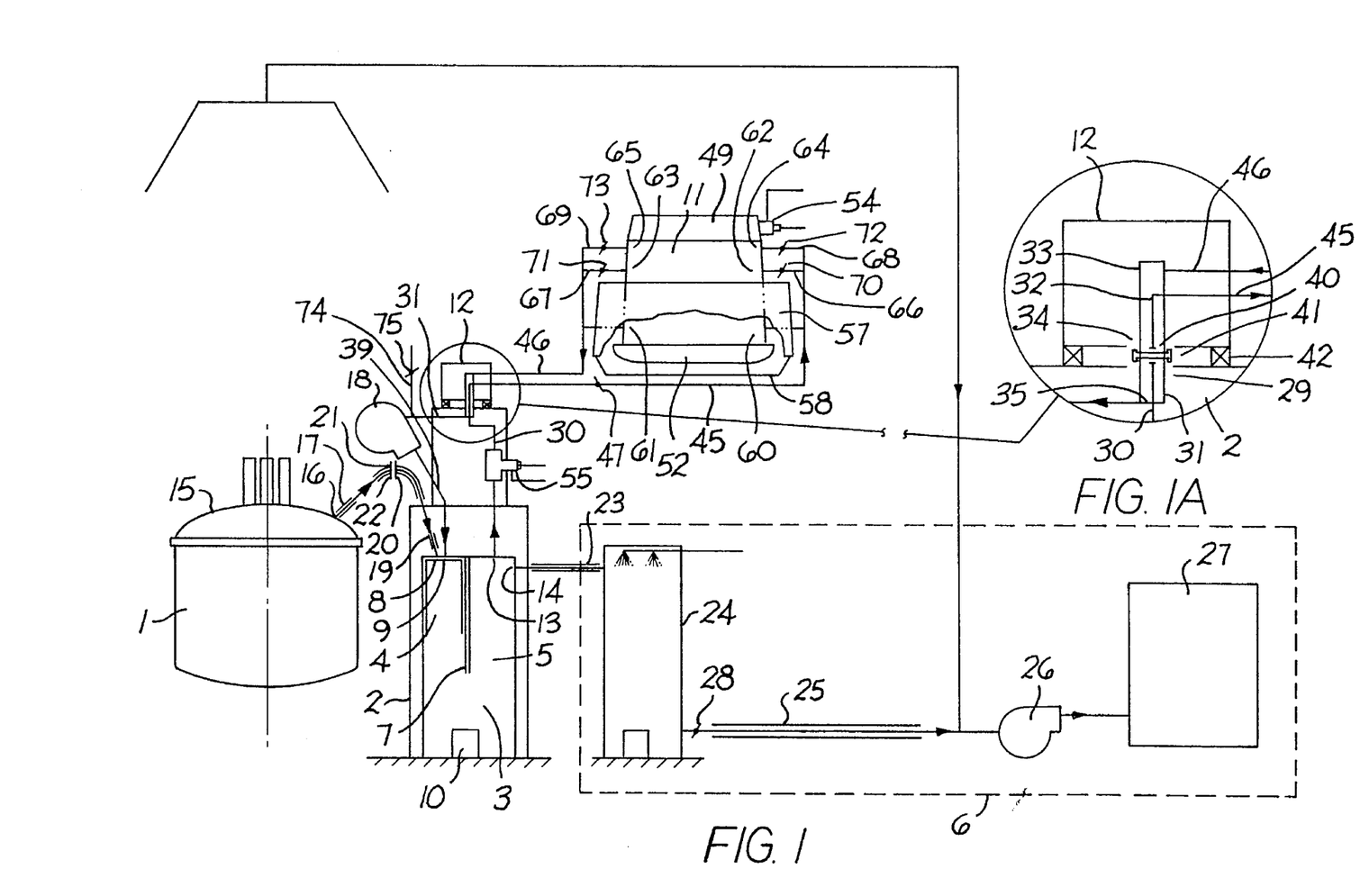
Figure 2:
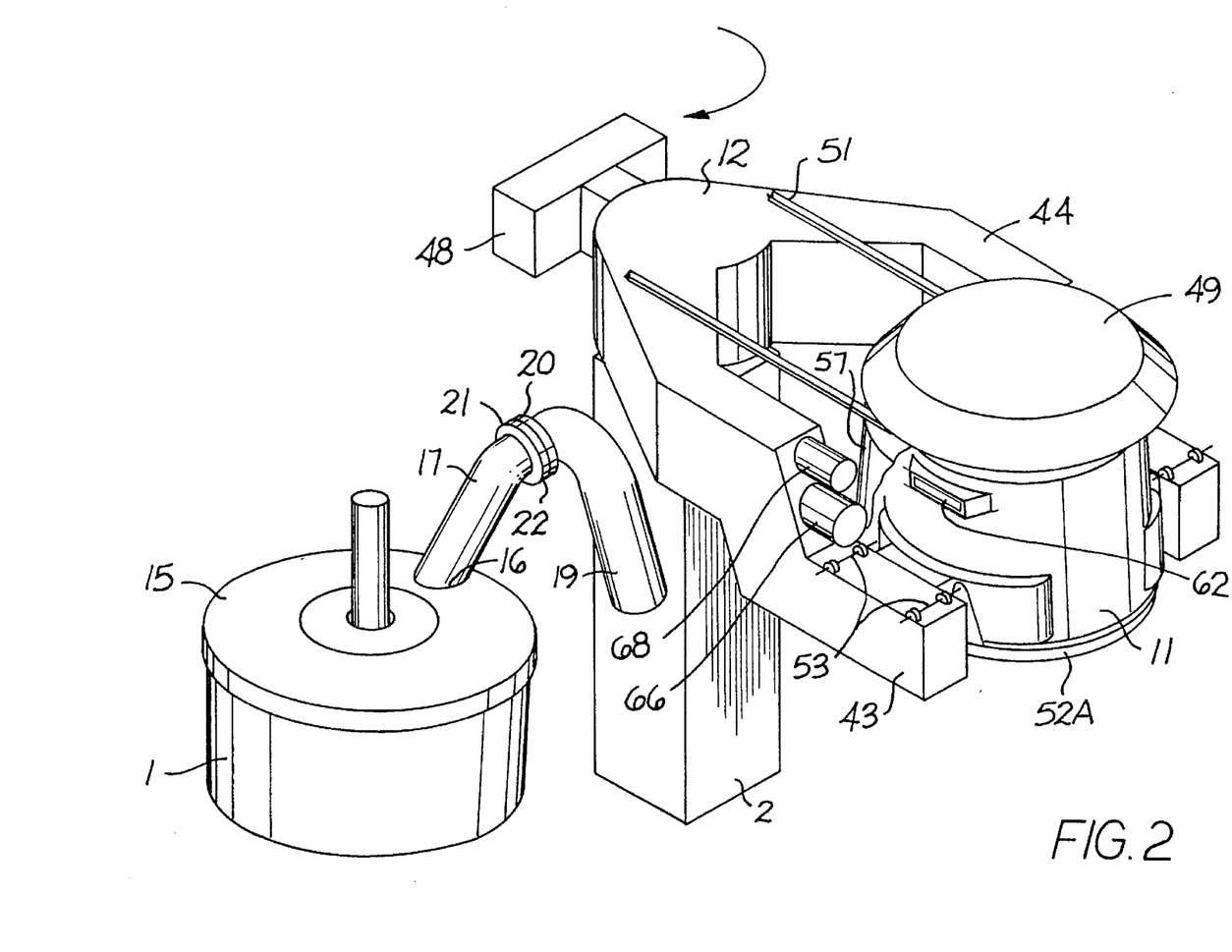
FIG. 2 is a perspective view of a furnace preheat system made in accordance with the present invention, with the preheat vessel 11 located in the Loading/Preheat Position (the preheat vessel enclosure and the secondary and terriery ducts partially removed for clarity)
Figure 3:
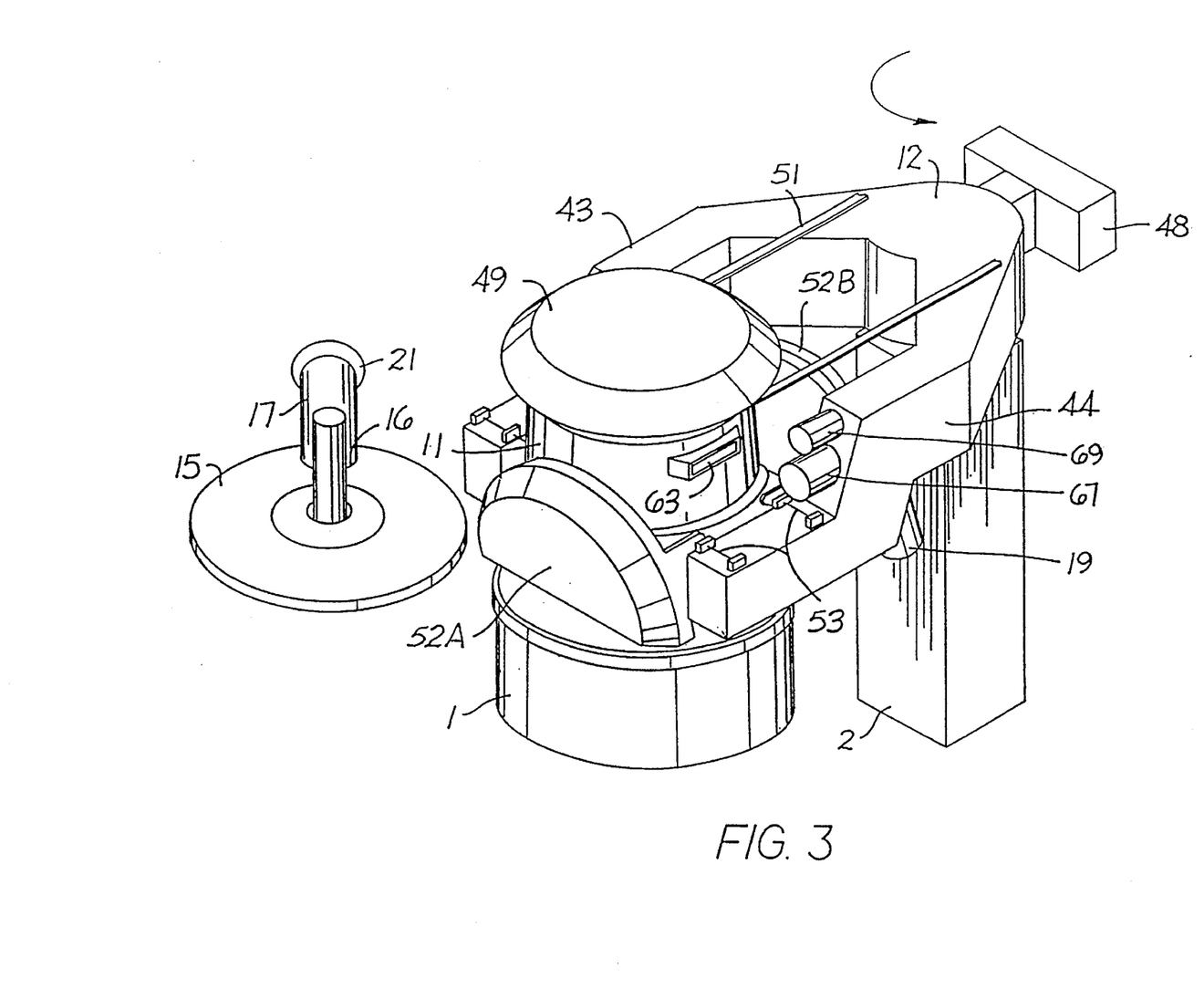
FIG. 3 is a perspective view of the furnace preheat system of FIG. 2 with the turret rotated 90° so the preheat vessel can charge the furnace (the preheat vessel enclosure has been omitted from this view for clarity)

As can be seen in FIGS. 1–5, the preferred embodiment of the invention is a furnace preheat system which includes a preheat vessel 11 mounted on a rotating turret 12, which is located adjacent to the heating or melting furnace 1. (The furnace may be an electric arc furnace 1 or other type of furnace.) The rotating turret 12 allows the preheat vessel 11 to be positioned immediately adjacent to the furnace 1 when in the Loading/Preheat Position (FIG. 2), and then be extended over the center of the furnace when in the Charging Position (FIG. 3).

Figure 4:
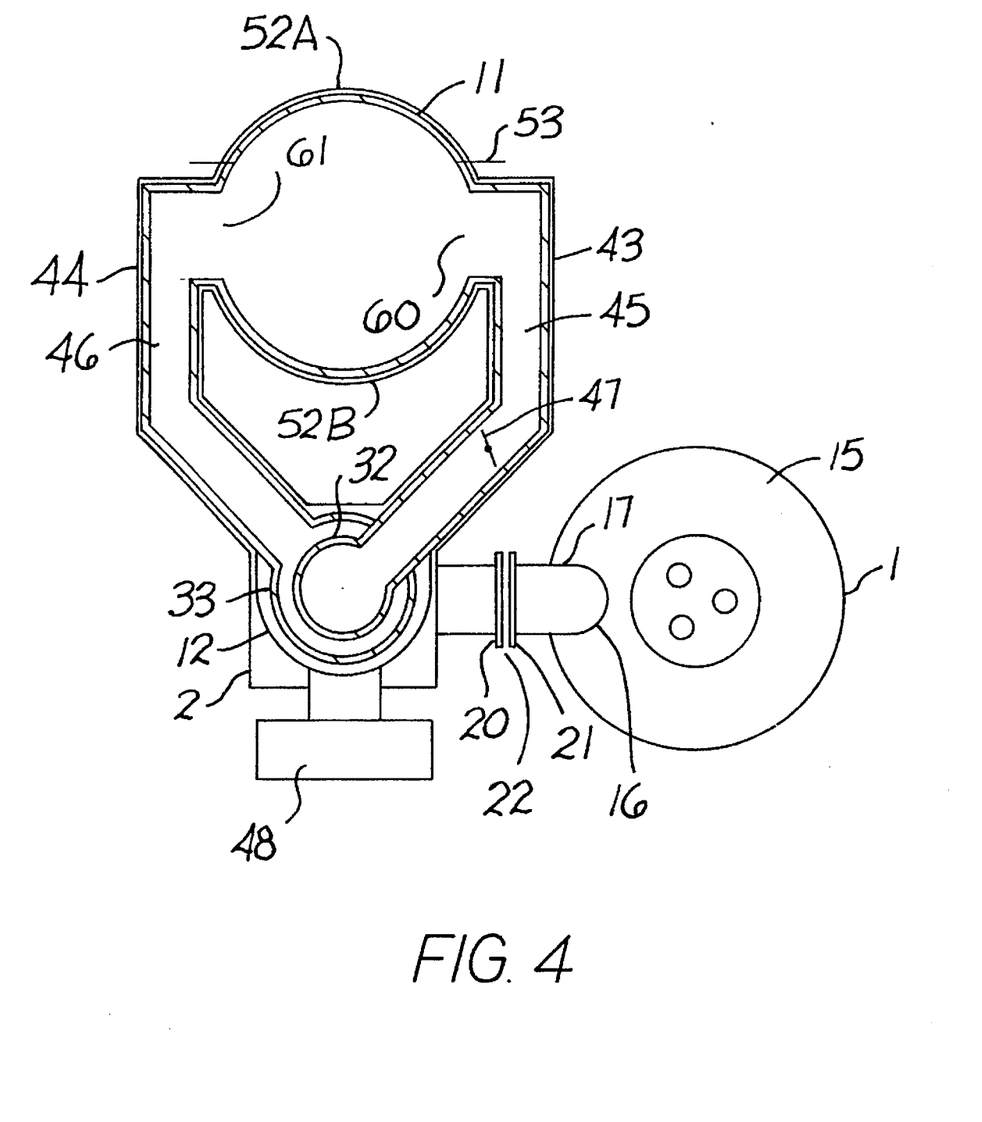
FIG. 4 is a sectional view through the turret, the vessel support arms, and the preheat vessel at the level of the first and second main duct opening.
Figure 5:
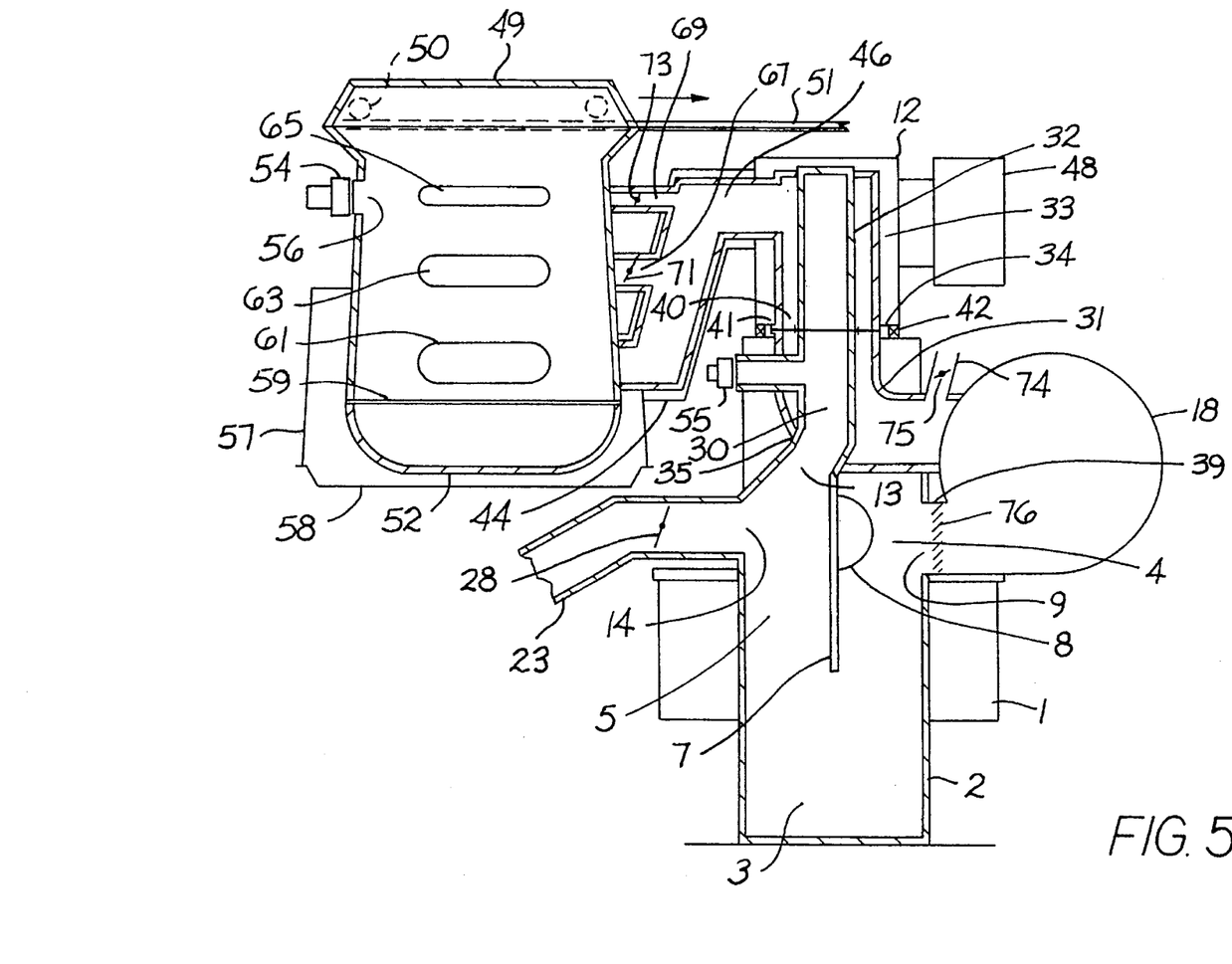
FIG. 5 is a back sectional view of the furnace preheat system shown in FIG. 2.

Referring to FIG. 4, the turret 12 is supported on a concrete or structural steel column 2, and is adapted to rotate relative to the column 2, as indicated by the arrow in FIG. 2. The turret rotation is typically 90° from the Loading/ Preheat Position to the Charging Position over the furnace, although the rotation may be more or less than 90°, depending on the location of the turret column 2 with respect to the furnace as well as the specific angular location of the Loading/Preheat Position. It may be desired, due to the shop layout or operating practice, to have the Loading Position and Preheat Position be separate positions. With the preferred embodiment of the invention, separate locations require minimal alteration of the design.

A receiving chamber 3 is incorporated within the lower portion of the turret column 2. The receiving chamber 3 may be formed by the structure of the column 2 itself or have its own structure independent of the column 2, having its own bottom, walls, and top. The receiving chamber 3 has a substantially vertical cylindrical form, with the horizonal cross-section adjusted to fit within the column 2 structure (the horizonal cross-section may even be quite irregular). Locating the receiving chamber 3 within the column 2 is not required by the present invention; however, due to space considerations in the immediate vicinity of the furnace, the most feasible location for the chamber 3 is within the column 2.

The receiving chamber 3 receives off-gases from the furnace 1 and return fumes from the preheat vessel 11 in the entry 4 of the chamber, and exhausts gases to the preheat vessel 11 and to the air treatment system 6 from the exit 5 of the chamber 3. The entry 4 and exit 5 of the chamber 3 may be at opposite ends of the chamber; however the preferred embodiment incorporates a vertical divider 7 to define the entry 4 and exit 5 of the chamber 3. As shown in FIG. 1, the entry 4 and exit 5 are both located at the top of the chamber 3, with the divider 7 extending from the top of the chamber, allowing communication between the entry 4 and the exit 5 only in the lower one-third or so of the chamber.

The chamber entry 4 defines two duct openings, a first entry duct opening 8 that communicates with the furnace 1, and a second entry duct opening 9 that communicates with the vessel circulation fan 18 and, ultimately, with the preheat vessel 11. The chamber exit 5 also defines two duct openings, a first exit duct opening 13 that communicates with the preheat vessel 11 and a second exit duct opening 14 that communicates with the air treatment system 6. The chamber also provides a cleanout access door 10.

The receiving chamber entry 4 is typically water-cooled, as is the divider 7. The balance of the receiving chamber is typically refractory lined, although the exit duct openings may be water-cooled fabrications due to the abrasive action of the off-gases.

The furnace roof 15 defines a duct opening 16 for the removal of gases from the furnace 1. The furnace duct 17 is fixed to the furnace roof duct opening 16 and extends angularly upward away from the centerline of the furnace. The receiving chamber entry duct 19 is fixed on the lower end to the first entry duct opening 8 in the receiving chamber entry 4. The upper end 21 of the furnace duct 17 and the upper end 20 of the receiving chamber entry duct 19 define the combustion air gap 22. This combustion air gap 22 is a known feature of furnace off-gas systems, and allows ambient air to be drawn into the off-gas stream, providing oxygen for the burning of combustible fumes in the off-gases. The furnace duct 17 and the receiving vessel entry duct 19 are both typically water-cooled ducts, and together with the aforementioned duct openings 8 and 16, allow fluid communication from the furnace 1 to the receiving chamber entry 4 when the furnace roof 15 is in place on the furnace 1.

The air system duct 23 extends from the second exit duct opening 14 in the receiving chamber exit 5 to the air treatment system 6, and allows fluid communication from the receiving chamber 3 to the air treatment system 6. The air system duct 23 is typically water-cooled. The air treatment system 6 typically includes a water-cooled quench chamber 24, a length of water-cooled duct 25, an air system fan 26, and a baghouse 27. The air treatment system 6, the furnace 1 and the off-gases are part of the environment of the invention, and any particular air treatment system may differ in types and arrangement of equipment from that shown in FIG. 1.

The air treatment system 25 incorporates a damper 28. This damper 28 regulates the draft on the furnace 1, so as to maintain the correct internal air pressure in the furnace 1. The air system fan 26 pulls air and gases through the water-cooled duct 25, creating a negative pressure (below atmospheric) in all components of the air treatment and furnace preheating system that are in fluid communication with the fan 26.

The uppermost part of the turret support column 2 has a substantially vertical cylindrical opening 29 in its center. In the preferred embodiment, two concentric lower conduits, a lower inner conduit 30 and a lower outer conduit 31, extend through that central vertical opening 29 in the uppermost part of the column 2, and are fixed to the column 2. The top portion of the lower inner 30 and lower outer 31 conduits are aligned, respectively, with concentric upper inner 32 and upper outer 33 conduit portions, the lower outer and upper outer conduits defining a central opening in the turret 34.

The lower outer conduit portion 31 extends downward, turning substantially horizontal at a location just below the central opening 29 in the turret column 2. The lower inner conduit portion 30 extends substantially straight down, and penetrates the wall of the lower outer conduit portion 31 as the lower outer conduit turns to the horizontal. The penetration of the lower inner conduit 30 through the lower outer conduit wall defines an opening 35 in the lower outer conduit 31 wall. This opening 35 is sealed to the lower inner conduit 30, preventing any flow of gases or air into or out of the lower outer conduit 31 through the opening 35. The lower outer conduit 31 extends out of the column 2, and is fixed to the inlet 36 of the vessel circulation fan 18.

The outlet 37 of the vessel circulation fan 18 is fixed to a duct 39 which extends into the column 2 and is fixed to the second entry duct opening 9 defined by the receiving chamber entry 4.

The lower inner conduit portion 30 extends downward, and is fixed to the first exit duct opening 13 defined by the receiving chamber exit 5.

The upper inner and outer conduits 32 and 33 rotate with the turret 16, while the lower conduits 30 and 31 are stationary. Between the upper and lower conduits, inner to inner and outer to outer, respectively, are seals, 40 and 41, preferably labyrinth-type seals, which minimize fume infiltration between ducts or ambient air infiltration into the ducts. As shown in FIG. 4, there is also a bearing 42 between the turret 12 and the column 2 to support the weight of the turret 12 and to permit the turret to rotate relative to the column 2.

In the figures, the dampers are shown as pivoting type dampers. However, a variety of damper designs would function. These dampers are preferably of a refractory design, but water-cooled and, in some locations, air-cooled dampers could be used. Design of any of these damper types is well-known in the art. The dampers may be operated hydraulically or electrically.

The preheat vessel 11 is supported on the turret 12 by the turret support arms 43 and 44. The vessel may be removable from the turret 12. There is a first vessel duct 45 which extends from the upper inner conduit 32, through the wall of the upper outer conduit 33 and to a first side of the preheat vessel 11. There is a second vessel duct 46 extending from the upper outer conduit 33 to a second side of the preheat vessel substantially opposite the first side. The first vessel duct 45 incorporates a damper 47 to regulate the flow of gases into the preheat vessel. The first and second vessel ducts 45 and 46, the support arms 43 and 44, and the preheat vessel rotate with the turret 12. For most turret sizes, a counterweight 48 will be required on the opposite side of the turret 12 from the support arms 43 and 44 and preheat vessel 11.

With both ducts to the preheat vessel 11 passing within the central conduit 34 of the turret 12, the first and second vessel ducts 45 and 46 are fixed to the duct openings in the preheat vessel 11 sides, eliminating the requirement of duct connections to make and break with rotation of the turret 12. In the preferred embodiment, the first and second vessel ducts 45 and 46 are located within the turret support arms 43 and 44. In some arrangements, it may be preferable to have these ducts independent of the support arms.

The preheat vessel 11 has a top 49 which opens to allow the preheat vessel 11 to be loaded with material to be preheated. The preferred embodiment of the vessel top 49 is a single piece that retracts to open, moving on wheels 50 which move on rails 51, as indicated by the arrow in FIG. 5.

The preheat vessel has a bottom 52, made in two halves, 52A and 52B, which pivot about pivot points 53 in order to open. Some vessel adaptations may provide for some leakage of ambient air into the preheat vessel 11 around the bottom halves 52A and 52B. This leakage would provide combustion air for burning of combustible contaminants in the scrap as the scrap is preheated. The vessel may also have a fueled burner 54. The burner 54 may be fixed to the preheat vessel 11 or supported externally to the turret 12, such that when the preheat vessel 11 is in the preheat position, the burner 54 aligns with a port 56 in the vessel wall. An additional burner 55 may be aligned with a port 57 in the lower inner conduit 30 in the column 2.

The lower portion of the preheat vessel 11, including the vessel bottom 52 is encompassed by a preheat vessel enclosure 57. The enclosure 57 is open on the bottom. The enclosure 57 is of sufficient size and is fixed to the preheat vessel 11 at a position sufficiently high on the vessel so as to allow the bottom halves 52A and 52B to be opened within the enclosure. When the preheat vessel 11 is positioned in the Loading and Preheat Positions, an enclosure platform 58 will seat against the open bottom of the enclosure 57. The enclosure 57 and enclosure platform 58 completely enclose the preheat vessel bottom 52, so that the preheat vessel bottom 52 need not be the primary means of preventing air infiltration into the preheat vessel bottom opening 59. The enclosure platform 58 also catches any melted materials that may drip from the vessel bottom 52 during preheating.

The inside of the preheat vessel 11 is substantially cylindrical, but will have a slightly larger diameter at the bottom than at the top, to facilitate the discharge of preheated material out the vessel bottom opening 59. The interior of the vessel is generally refractory lined, although some adaptations may be unlined and other adaptations water-cooled. Some areas of unlined and refractory lined vessels may be water-cooled.

The preheat vessel 11 defines duct openings in the sides of the preheat vessel. The preferred embodiment of the invention includes multiple duct openings in two substantially opposite sides of the preheat vessel 11, including a first main duct opening 60 and a second main duct opening 61. These main duct openings are in fluid communication with the first vessel duct 45 and the second vessel duct 46, respectively. The main duct openings are positioned a short distance above the preheat vessel bottom opening 59. Additionally, there will be two secondary duct openings, a first secondary duct opening 62 positioned above the first main duct opening 60 and the second secondary duct opening 63 positioned above the second main duct opening 61. Larger vessels will have a first 64 and second 65 tertiary duct openings, positioned above the first 62 and second 63 secondary duct openings, respectively. These multiple duct openings distribute the gases to the vessel across a wide area of material to be preheated, causing a more even heat distribution in the material than can be accomplished with a single entry point.

The first vessel duct 45 is in fluid communication with a first secondary duct 66 and a first secondary duct damper 70 and first tertiary duct 68 and a first tertiary duct damper 72. The second vessel duct 46 is in fluid communication with a second secondary duct 67 and a first secondary duct damper 71 and second tertiary duct 69 and a second tertiary duct damper 73. Each duct is fixed to and in fluid communication with the respective duct opening in the preheat vessel 11.

In operation, off-gases from the furnace 1 will exit the furnace through the furnace duct 17, combine with ambient air as the gas stream flows pass the combustion air gap 22, enter the receiving chamber entry duct 19 and enter the receiving chamber 3. The off-gases entering the receiving chamber 3 will be at a temperature of 2200° F. to 2400° F. Also entering the entry 4 of the receiving chamber are return fumes from the preheat vessel 11, which are drawn from the preheat vessel 11 by the circulation fan 18 and discharged into the receiving chamber entry 4 through the duct 39. These preheat vessel return fumes typically range in temperature from 200° F. to 700° F., and contain combustible hydrocarbons vaporized but unburned in the preheat vessel. As these off-gases mix with the preheat vessel return fumes, the hydrocarbons combust. Even with the combustion of these hydrocarbons, sufficient amounts of cooler return fumes are mixed with the off-gases to reduce the combined gas temperature to the 1600° F. to 1850° F. range. This temperature range is sufficient to achieve combustion of products in the gas stream originating from either the furnace 1 or the preheat vessel 11.

The receiving chamber 3 is configured to allow the combined gas stream a residence time in the chamber 3 of up to 1.5 seconds. This is a greater residence time than typically afforded in furnace off-gas systems, and will therefore reduce the level of undesirable products in the resulting gas stream below that of current industry standards.

As the combined gas stream flows into the lower portion of the receiving chamber 3, the gas velocity will reduce as the chamber cross-sectional area increases below the chamber divider 7. This decrease in gas velocity coupled with the 180° direction change of the gases will cause any heavy pieces of material and, more importantly, any slag from the furnace, to fall to the chamber floor. If the furnace slag is not removed from the gas stream, the slag will build up on the dampers and cause jamming of the dampers or other continuing maintenance problems.

As the gases enter the exit 5 of the receiving chamber 3, a portion of the gases exits the chamber 3 through the air system duct 23 and flow to the air treatment system 6. The remaining portion of the gases is drawn into the lower inner conduit 30, into the upper inner conduit 32, and into the first vessel duct 45. The gases are further drawn through the preheat vessel 11, thus preheating the material in the vessel, and into the second vessel duct 46, through the upper 33 and lower 31 outer conduits to the circulation fan 18. It is this fan 18 that draws the fumes from the receiving chamber 3, through the material to be preheated contained in the preheat vessel 11, and returns the fumes to the receiving chamber entry 4.

The circulation fan 18 is designed to operate at elevated temperatures. As the temperatures from the vessel 11 approach the design limit of the fan, ambient air is introduced into the gas stream through the dilution air duct 74. The entry of dilution air is regulated by the dilution air damper 75. The dilution air damper is also used to allow ambient air to enter the system to provide oxygen for combustion of fumes from the material being preheated.

To maximize preheating of material in the preheat vessel, as much of the gases entering the receiving chamber exit 5 as possible should go the the preheat vessel 11. The proportion of gases going to the preheat vessel 11 will be limited by the need to maintain the temperature in the receiving chamber 3 at or above 1600° F., which limits the amount of cooler fumes that can be mixed with the furnace off-gas. If addditional preheating is desired, one or both of the burners 54 and 55 can be used for supplemental heating. It is desirable to use the duct burner 55 to raise the temperature of the gases entering the preheat vessel to 1850° F., under most circumstances, to increase the heat transfer rate.

By limiting the gas temperatures leaving the receiving chamber 3 to the levels indicated, the refractory, dampers, seals, and every other component of the preheating system will be significantly easier to maintain. Less expensive materials can be used for construction, particularly refractory. The temperature of the preheated material is much more uniform, and no scrap will melt in the vessel. By using recirculated fumes from the preheat vessel 11 for cooling the off-gases, the total gas volume to the air treatment system is much less than if ambient air were used for cooling. The off-gases from the furnace provide the energy to burn the combustibles in the preheat vessel return fumes, eliminating the need for a second combustion chamber as well as the cost of fuel to operate such a chamber.

When the furnace 1 is ready for the next charge, the furnace ceases operation and the roof 15 swings clear of the furnace vessel. The enclosure platform 58 lowers sufficiently to clear the vessel bottom 52. The turret 12 then rotates as necessary to position the preheat vessel 11 directly over the furnace 1. When the preheat vessel is in this position, the perimeter of the preheat vessel enclosure 57 extends to or beyond the outer perimeter of the furnace vessel. The preheat vessel bottom 52 opens, discharging the preheated contents into the furnace. The bottom 52 of the preheat vessel closes, the turret 12 rotates back to the loading and preheating position, the roof 15 swings back on the furnace, and the furnace begins operating. This completes the charging cycle.

As the turret 12 rotates, the preheat vessel 11 stays in fluid communication with the air treatment system 6 at all positions of the vessel. As the duct connections to the vessel are fixed, the only motion between ducts is the movement occurring in the turret central opening 34. Because the movement is a rotating motion, the upper 32 and lower 30 inner ducts and the upper 33 and lower 31 outer ducts remain aligned, respectively, and the fluid communication is never interrupted.

During the preheating process, much of the contaminants in the material being preheated are removed. Thus, when the material is dropped into the furnace, the charging plume is much reduced from the typical charging plume. Further, when the vessel 11 is in the charging position over the furnace 1, the vessel enclosure 57 prevents escape of fumes into the shop. The limited amount of fumes that are present are drawn into the preheat vessel 11 and on to the air treatment system 6 as described.

After the preheat vessel returns to the loading and preheating position, the enclosure platform 58 raises and seats against the preheat vessel enclosure 57. The top 49 of the preheat vessel retracts, and the vessel is loaded with material to be preheated. If any fumes are generated in the preheat vessel as the material is dropped into the hot vessel, the fumes are drawn out of the vessel 11 into the ductwork, the receiving chamber 3 and on to the air treatment system 6. The amount of draft on the vessel 11 while loading is adjusted by first vessel duct damper 47 and circulation fan discharge damper 76.

If it is desired to operate the furnace without preheating, closing dampers 47 and 76 permits the furnace 1 to be operated while fully bypassing the preheating system.

ALTERNATIVE PREHEATING SYSTEMS

Some producers may not desire to use furnace off-gases for preheating. The present invention can be easily adapted for this application. Referring to FIG. 1, if the producer desires to use only burners for preheating, it is only necessary to close the receiving chamber 3 first exit duct opening 13. This prevents any off-gases from circulating to the preheat vessel 11. Heating of the material in the preheat vessel 11 is accomplished by the burners 54 and 55 only. All other aspects of the preheater operation remain the same as previously described.

Yet another option would be to use electrical energy for preheating. With this option, ductwork from the vessel to the receiving chamber would be no more than a small duct following the routing of the vessel return duct 46. A circulation fan would not be required, as the existing air treatment system fan 26 would be capable of providing a small negative pressure to the preheat vessel 11. (With no burners or off-gas flow to the vessel, the fume volume from the vessel would be very small relative to previously described alternatives.) Heating could be supplied to the material by induction heating coils in the vessel lining, or even radiant heaters in the top 49.

Figure 6:
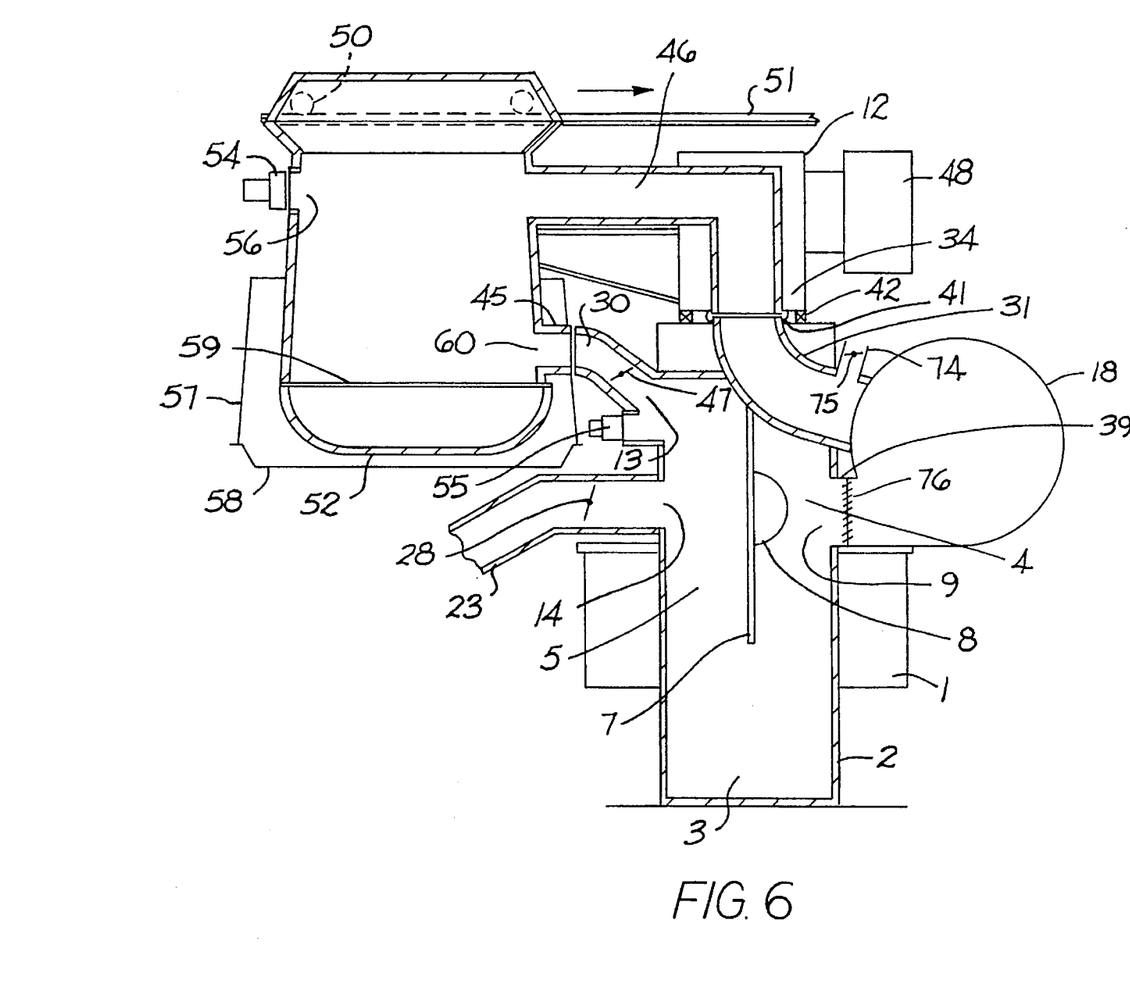
FIG. 6 is a variation of the sectional view shown in FIG. 5, having only one duct going through the turret.

FIG. 6 is an arrangement using only a single duct through the turret central opening. The second duct to the vessel is a stationary duct 30 extending from the receiving chamber exit 5 through the column 2. The upper end of the stationary duct 30 is configured in a radius equal to the distance of the end of the duct 30 from the rotating axis of the turret. The duct 45 fixed to the preheat vessel duct opening 60 has substantially the same radius, such that when the preheat vessel 11 is in the loading and preheat position, the ducts 30 and 45 are in fluid communication. Operation of this arrangement is the same as previously described.

Figure 7:
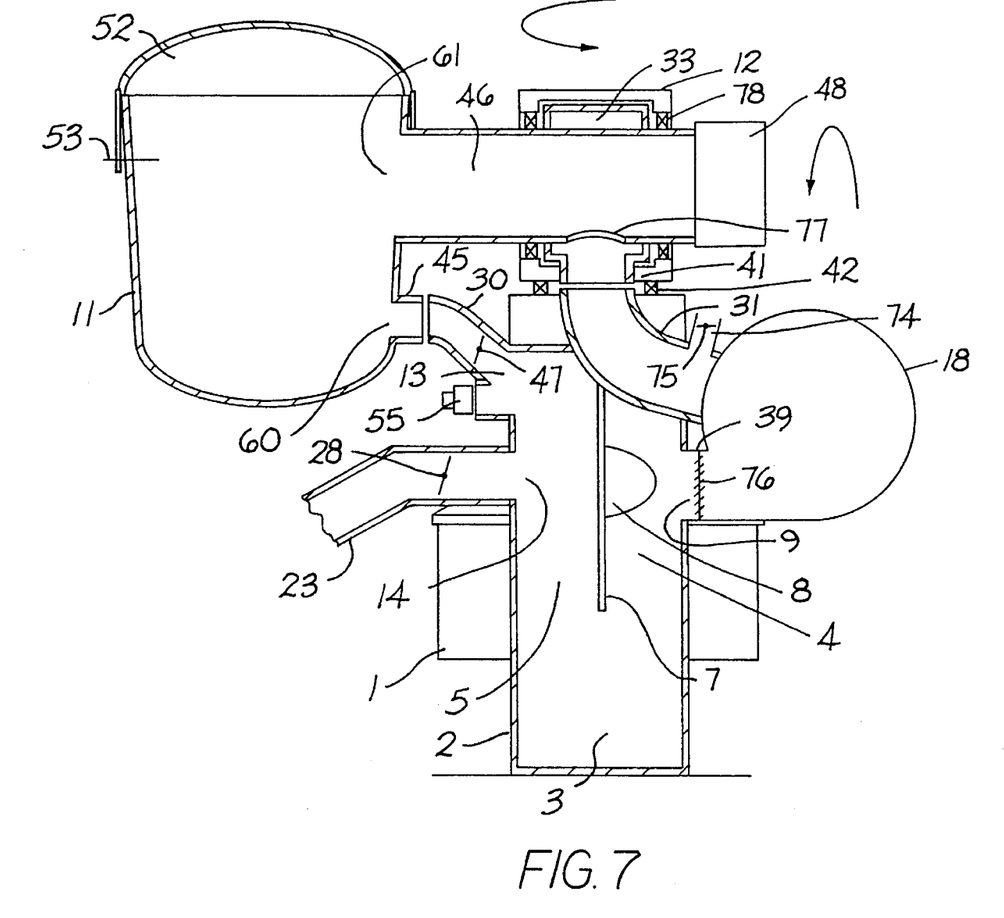
FIG. 7 is an alternate design for the preheat vessel and turret support arm.

FIG. 7 presents an adaptation of the present invention using only a single vessel opening for both loading and discharging of material. The three differences incorporated herein are: one end of the vessel is permanently closed; the single vessel opening is a bottom opening as described in the preferred embodiment; and that in addition to rotating from a preheat and loading position to a charging position over the furnace, the single turret support arm 44 is adapted to also rotate as indicated by the second arrow in FIG. 7. This allows a single vessel opening to be used for both loading and charging. The vessel remains in fluid communication with the air treatment system as it rotates, through the means of duct opening 77 being always open to the upper duct 33 as the support arm 44 rotates on bearings 78.

It will be obvious to those skilled in the art that modifications may be made to the embodiment described above without departing from the scope of the present invention.

What is claimed is:

1. A preheat system comprising:

a furnace;

a central rotatable member including at least one conduit;

a preheat vessel including a closable top opening for receiving material and a closable bottom opening for discharging material into the furnace, wherein ambient air is substantially impeded from entering into said preheat vessel when said top and bottom openings are closed, said preheat vessel being mounted on said central rotatable member and in fluid communication with said conduit, such that, as said rotatable member rotates, it puts said preheat vessel directly over the furnace for charging and then puts said preheat vessel into a loading position for loading the preheat vessel with material and into a preheat position wherein material in the vessel is preheated; and further comprising a stationary lower duct and an upper duct, and a side opening in said preheat vessel, wherein said preheat vessel is fixed to the upper duct, which communicates with said conduit and which rotates with said central rotatable member, and wherein, when it is in a preheat position, the side opening of said preheat vessel is aligned with and communicates with said stationary lower duct, at least one of said upper and lower ducts also being in fluid communication with the furnace so as to receive furnace off-gases when the preheat vessel is in a preheat position.

2. A preheat system comprising:

a furnace;

an air treatment system;

a central rotatable member including at least one conduit;

a preheat vessel including a closable top opening for receiving material and a closable bottom opening for discharging material into the furnace, wherein ambient air is substantially impeded from entering into said preheat vessel when said top and bottom openings are closed, said preheat vessel being mounted on said central rotatable member and in fluid communication with said conduit, such that, as said rotatable member rotates, it puts said preheat vessel directly over the furnace for charging and then puts said preheat vessel into a loading position for loading the preheat vessel with material and into a preheat position wherein material in the vessel can be preheated; wherein said central rotatable member includes two discrete conduits, and further comprising a left duct and a right duct, and two side openings on substantially opposite sides of said preheat vessel, wherein said preheat vessel is fixed to both ducts, wherein said ducts communicate with said conduits and rotate with said central rotatable member; and wherein, when said preheat vessel is in a preheat position, one of said ducts is in fluid communication with the furnace so as to receive furnace off-gases, and the other of said ducts is in fluid communication with the air treatment system so as to exhaust gases from the preheat vessel.

3. A preheat system, comprising:

a furnace;

an air treatment system;

a preheat vessel for holding material to be preheated, said preheat vessel comprising:

a preheat vessel body adapted to hold material to be preheated, said preheat vessel body also defining a closable top opening at the top of said preheat vessel body for receiving material, a closable bottom opening at the bottom of said preheat vessel body for emptying material into said furnace, and at least two duct openings, wherein one of said duct openings is on one side of said preheat vessel body, and the other duct opening is on the substantially opposite side of said preheat vessel body, wherein the one duct opening is in fluid communication with the furnace, and the other duct opening on the substantially opposite side of the preheat vessel body is in fluid communication with the air treatment system;

said preheat vessel being mounted on a movable member for moving the preheat vessel to a position over a furnace for charging the furnace as well as to a position for loading and preheating of material.

4. A preheat system as recited in claim 3, wherein said preheat vessel comprises:

at least four duct openings, wherein two of said duct openings are positioned one above the other on one side of said preheat vessel, and two duct openings are similarly configured on the substantially opposite side of said preheat vessel body, wherein the two of said duct openings on one side of said preheat vessel body are in fluid communication with the furnace, and said duct openings on the substantially opposite side of the preheat vessel body are in fluid communication with the air treatment system.

5. A preheat system as recited in claim 4, further comprising:

a receiving chamber having an entry and an exit, said entry and said exit being in fluid communication with each other;

ductwork from said preheat vessel body to said receiving chamber entry, such that said receiving chamber entry is in fluid communication with said two duct openings on one side of said preheat vessel body; and, ductwork from said preheat vessel body to said receiving chamber exit, such that said receiving chamber exit is in fluid communication with said two duct openings on the substantially opposite side of the preheat vessel body.

6. A furnace preheat system, comprising:

a turret, including a rotatable portion and a stationary portion, said rotatable portion including first and second conduits;

a preheat vessel mounted on the rotatable portion of said turret, said preheat vessel including first and second vessel openings;

first and second conduit arms; said first conduit arm being fixed to said turret and to said preheat vessel so as to provide fluid communication from said first vessel opening to said first conduit as said rotatable portion of said turret rotates, and said second conduit arm fixed to said turret and to said preheat vessel so as to provide fluid communication from said second vessel opening to said second conduit as said rotatable portion of said turret rotates.

7. A furnace preheat system as recited in claim 6, wherein said first and second conduits are concentric and extend into the stationary portion of said turret, so that said first and second conduits each include a rotatable portion and a stationary portion; and further comprising a first seal between the stationary and rotating portions of said first conduit and a second seal between the stationary and rotating portions of said second conduit.

8. A furnace preheat system as recited in claim 7, and further comprising a mixing chamber in fluid communication with said first and second conduits and including a furnace off-gas port for receiving off-gas from a furnace and including an air cleaning system port for sending gas to an air cleaning system, wherein said mixing chamber includes an enlarged-diameter portion so that gas coming in through the furnace off-gas port and the first conduit has to slow down in said mixing chamber before exiting through said air cleaning system output port and said second conduit, so as to provide an opportunity for heavy solids to fall out of the gas before leaving said mixing chamber and so as to provide residence time which permits volatiles in the gas to combust in said mixing chamber.

9. A furnace preheat system, comprising:
   a furnace;
   a turret, including a stationary portion and a pivoting portion;
   a preheat vessel mounted on said turret so as to pivot with said pivoting portion of said turret, such that said preheat vessel pivots over said furnace for charging the furnace and pivots to a loading position for loading material into said preheat vessel and to a preheat position;
   a receiving chamber having ports which provide fluid communication with said furnace and said preheat vessel, and with ductwork to an air cleaning system, wherein said receiving chamber has a larger diameter than any of said ports, so that said receiving chamber receives, reduces the velocity of, and mixes off-gas from said furnace and gas from said preheat vessel to make a gas mixture, then sends some of the gas mixture to the port to the air cleaning system and sends some of the gas mixture to the preheat vessel.

10. A method for preheating material prior to depositing the material in a furnace, comprising the steps of:
   providing a furnace, a mixing chamber, a preheat vessel, and an air cleaning system;
   heating the furnace and producing off-gases in the heating process;
   sending the off-gases from the furnace to the mixing chamber;
   drawing gas from the preheat vessel to the mixing chamber and mixing the gas from the preheat vessel with the off-gases from the furnace to form a gas mixture;
   then, sending part of the gas mixture to the air cleaning system; and
   sending part of the gas mixture to the preheat vessel.

* * * * *

UNITED STATES PATENT AND TRADEMARK OFFICE
CERTIFICATE OF CORRECTION

PATENT NO. : 5,581,574
DATED : Dec. 3, 1996
INVENTOR(S) : David E. Vice

It is certified that error appears in the above-indentified patent and that said Letters Patent is hereby corrected as shown below:

Column 4, line 34  after "present invention;", insert --Figure 1A is an enlarged schematic view of the rotating turret portion of Figure 1;--

Signed and Sealed this

Third Day of June, 1997

Attest:

BRUCE LEHMAN

Attesting Officer

Commissioner of Patents and Trademarks